UNITED STATES PATENT OFFICE.

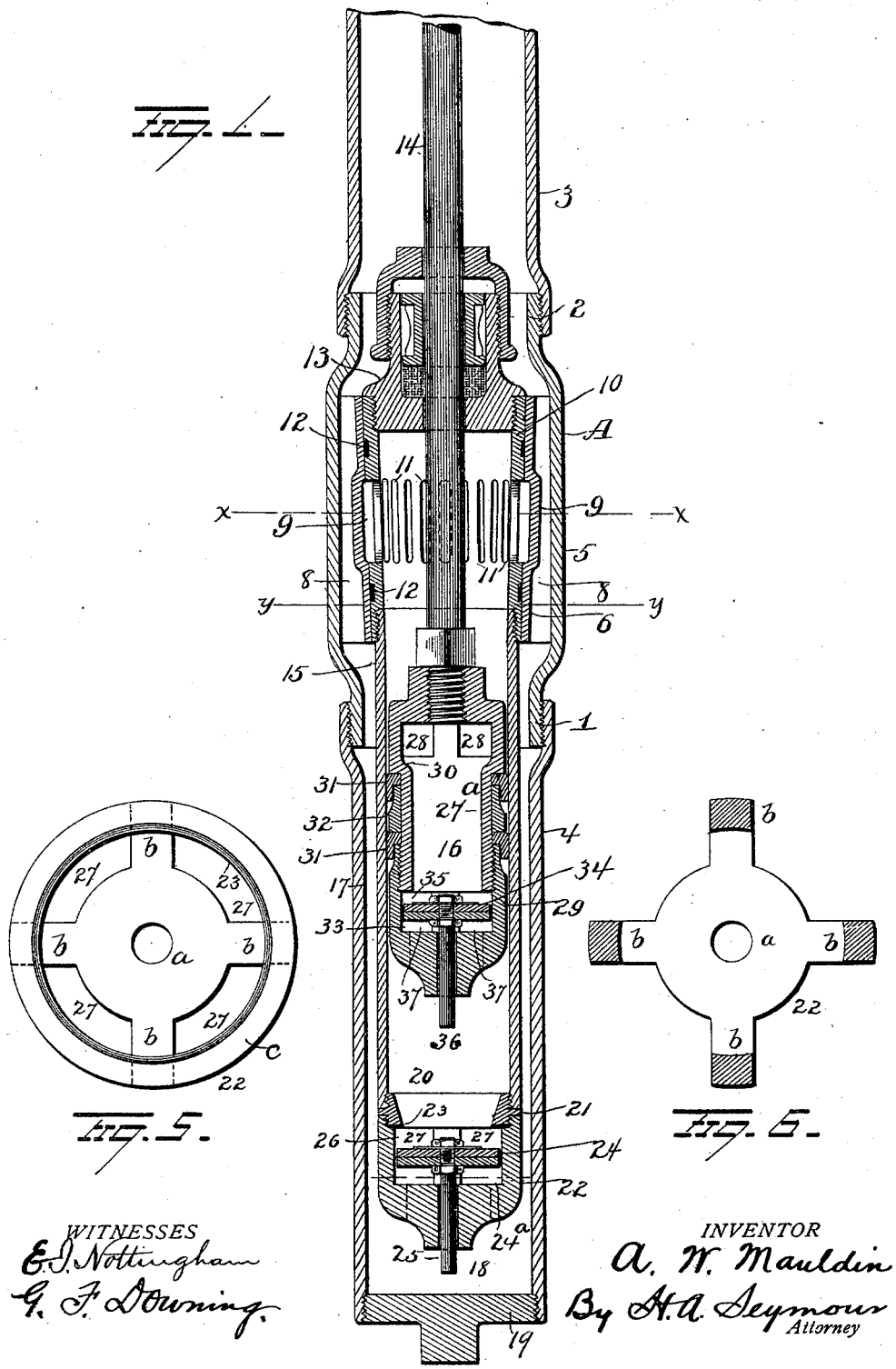

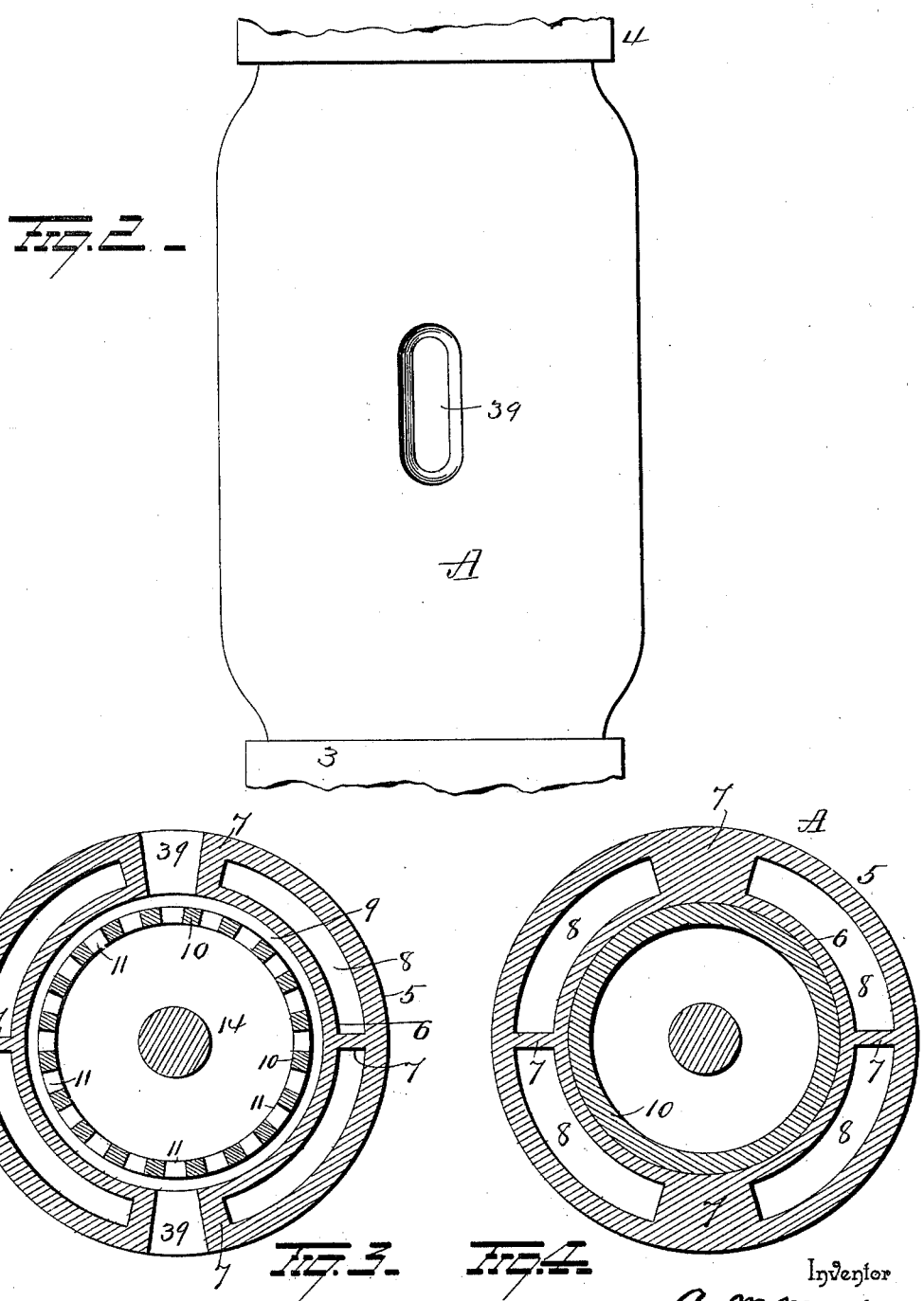

ALFRED W. MAULDIN, OF OZONA, TEXAS.

PUMP.

SPECIFICATION forming part of Letters Patent No. 600,545, dated March 15, 1898.

Application filed June 29, 1897. Serial No. 642,832. (No model.)

*To all whom it may concern:*

Be it known that I, ALFRED W. MAULDIN, a resident of Ozona, in the county of Crockett and State of Texas, have invented certain new and useful Improvements in Pumps; and I do hereby declare the following to be a full, clear, and exact description of the invention, such as will enable others skilled in the art to which it appertains to make and use the same.

My invention relates to an improvement in pumps, one object of the invention being to construct the apparatus in such manner that the weight of the plunger and its rod will be utilized to so balance the column of water that the power necessary to move the plunger in both directions will be about equal.

A further object is to so construct a pump that water can be forced to the surface with the expenditure of a minimum amount of power.

A further object is to produce a force-pump which shall be simple in construction, comparatively cheap to manufacture, which will operate with a minimum amount of resistance, and which shall be effectual in all respects in the performance of its functions.

With these objects in view the invention consists in certain novel features of construction and combinations and arrangements of parts, as hereinafter set forth, and pointed out in the claims.

In the accompanying drawings, Figure 1 is a vertical sectional view of a pump, illustrating my improvements. Fig. 2 is an exterior view of a portion of the apparatus. Fig. 3 is a cross-section on the line $x\,x$ of Fig. 1. Fig. 4 is a cross-section on the line $y\,y$ of Fig. 1. Figs. 5 and 6 are detail views.

A represents a pipe or shell contracted at its respective ends to form thimbles 1 2, which are screw-threaded for the reception of the lower end of the well-pipe 3 and the upper end of a pipe 4, respectively, said parts A, 3, and 4 being screwed together before being inserted into the well. The pipe or shell A is constructed with double walls 5 6, connected together at intervals by means of webs 7, thus forming a series of ducts 8 between said walls. The inner wall 6 of the shell or part A is made somewhat tapering, being of larger diameter at the upper than at the lower end, and is made at a point between its ends with an inner annular groove to form an annular chamber 9. A tapering pipe 10 is disposed within and supported by the tapering inner wall 6 of part A, said pipe being made with a number of elongated slots 11 of a length equal to the length of the annular chamber 9. At points above and below the annular series of elongated slots 11 and the chamber 9 the pipe 10 is provided with packing-rings 12 to lie against the inner face of the wall 6 of part A, and thus prevent the passage or leakage of water between said pipe and wall. The upper end of the pipe 10 is screw-threaded internally for the accommodation of a stuffing-box 13, through which the plunger-rod 14 passes, and the lower end of the pipe 10 is screw-threaded internally for the reception of the upper end of a pipe 15, in which the plunger 16, attached to said plunger-rod, is adapted to operate. It will be readily seen that the pipes 10 and 15 can be screwed together, the plunger inserted, and the stuffing-box for the plunger-rod placed in position with the plunger-rod passing through it before these parts are inserted into the shell or casing of the apparatus and that they may be all inserted together. When placed within the casing of the apparatus, it is apparent that the conical or tapering pipe 10 will readily seat itself within the conical or tapering wall 6 of the shell A and be supported thereby, the packing-ring 12, being disposed above and below the chamber 9 and slots 11, as above explained.

The pipe 15 is of a diameter sufficiently less than the internal diameter of the pipe 4 to form an annular chamber or duct 17 between it and said pipe 4, the upper end of which communicates with the ducts 8 and the lower end with a chamber 18 in the lower end of pipe 4, said lower end of the pipe 4 being closed air-tight by means of a plug 19. The lower end of the pipe 15 is screw-threaded internally for the reception of the screw-threaded upper end of a sleeve or coupling 20, said sleeve or coupling being provided with an external annular flange 21, against which the lower end of the pipe 15 is seated. The lower end of the sleeve or coupling 20 is screw-threaded externally for the reception of a cap 22, composed of a hub *a*, arms *b*, and a screw-threaded ring *c* at the upper ends of said arms, which ring lies tightly against the external annular flange 21 on the sleeve or coupling, the outer face of said flange being flush with the peripheral walls of the pipe 15 and ring *c* of cap 22. The lower end of the sleeve or coupling 20 forms an annular shoulder 23, which constitutes an upper seat for a valve 24, said valve being adapted to normally rest on a lower seat 24ª in the cap 22. The valve 24 is provided with a stem 25, which passes through a suitable hole in the hub *a* of the cap. The valve-chamber 26 has outlets 27 between the arms *b* to permit water to flow from the pipe 15 into the annular chamber or duct 17, as will be hereinafter more fully explained.

The plunger 16 is constructed with a body portion 27ª, having openings 28 in its upper end and screw-threaded externally at its lower end for the reception of an open cap or shell 29. The body portion of the plunger is made with an annular shoulder 30, and between this shoulder and the upper end of the cap or shell 29 packing-rings 31 and a spacing-ring 32 therefor are located. A valve-chamber 33 is formed within the cap or shell 29, which communicates with the hollow interior of the plunger, and within this chamber a valve 34 is located, one seat for said valve being formed by the inner bottom face of the cap or shell 29 and the other seat being formed by the end 35 of the body portion of the plunger, said valve being also provided with a rod 36, which passes through a hole in the bottom of the cap or shell 29. The valve-chamber 33 is provided with outlet-ports 37 under the control of the valve 34.

The double-walled shell or pipe A is made at diametrically opposite points with inlets 39, and through these inlets the water from the well flows into the annular chamber 9, through which it circulates, and passes through the annular series of elongated slots 11 into the pipe 10. Should the plunger be raised from the lower end of its stroke, the valve 24 will rise and close the outlet-ports 27 and the valve 34 in the plunger will be made to remain on its lower seat, and thus leave the outlet-ports 37 open. Thus during the upstroke of the plunger the water will flow into the same and out through the ports 37 into the pipe 15 below the plunger. Now when the plunger is moved downwardly the lower valve 24 will be forced down, so as to open the ports 27 and permit the water to flow into the annular duct 17. At the same time the valve 34 within the plunger will be made to rise and close the ports 37, and thus prevent any water from passing through the plunger during the downstroke of the same. The water in the pipe 15 below the plunger will therefore be forced into the annular chamber 17, between the pipes 15 and 4, and then up through the ducts 8 into the well-pipe 3, through which it will pass to the surface.

My improvements are very simple in construction, are comparatively cheap to manufacture, can be readily and quickly inserted into the well, and are effectual in all respects in the performance of their functions.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In a pump, the combination with a shell having a tapering interior wall and a chamber within said interior wall, of a tapering pipe seated within and supported by said tapering interior wall of the shell and communicating with said chamber, packing-rings in said tapering pipe above and below said chamber, a pipe communicating with the tapering pipe, a plunger within said last-mentioned pipe and inlet and outlet passages, substantially as set forth.

2. In a pump, the combination with a double-walled shell having intervening ducts and having inlets communicating with the interior of said shell, of a pipe seated within said shell and having inlets, a pipe communicating at its upper end with the pipe within the shell, a valve within the lower end of said last-mentioned pipe, a valved plunger within said last-mentioned pipe and a pipe communicating with the ducts in the shell and surrounding said last-mentioned pipe, substantially as set forth.

3. In a pump, the combination with a double-walled shell having intervening ducts, an annular chamber within the inner wall of the shell and inlets in said shell communicating with said annular chamber, of a pipe seated within said shell and having slots communicating with said annular chamber, a pipe communicating with said intervening ducts in the shell and closed at its lower end, a pipe communicating with said slotted pipe and having a valve at its lower end, said last-mentioned pipe terminating within the pipe which communicates with said intervening ducts in the shell, substantially as set forth.

4. In a pump, the combination with a double-walled shell having intervening ducts and a chamber in its inner wall, of a pipe seated within said shell and having openings communicating with said chamber, a pipe communicating with the intervening ducts in the shell and having a closed lower end, an inner pipe communicating with the pipe in the shell and so disposed as to leave a duct between it and said first-mentioned pipe, a valve-chamber at the lower end of said inner pipe adapted to communicate with the duct surrounding said inner pipe, a valve in said valve-chamber, a hollow plunger within said inner pipe and having an open upper end, a valve-chamber in said plunger adapted to communicate with said inner pipe and a valve in said valve-chamber, substantially as set forth.

5. In a pump, the combination with a shell having a double wall with intervening ducts, the inner wall of said shell being tapering and having an annular chamber therein, of a tapering pipe seated within said shell and having slots communicating with said annular chamber, an outer pipe secured to said shell and communicating with the intervening ducts therein, an inner pipe so disposed within the outer pipe as to form a duct between said pipes, said inner pipe communicating with the lower end of the tapering pipe, a valve-chamber in the lower end of the inner pipe and communicating with the duct between the inner and outer pipes, a valve in said valve-chamber, a stuffing-box secured to the upper end of the tapering pipe, a plunger-rod passing through said stuffing-box, a hollow valved plunger connected to said plunger-rod within the inner pipe and communicating with the same above and below, and a well-pipe secured to the upper end of said shell, substantially as set forth.

6. In a pump, the combination with a double-walled shell having intervening ducts, and an outer pipe secured to said shell and communicating with said ducts, of an inner pipe within the outer pipe and communicating therewith and with the interior of the shell, a sleeve secured in the lower end of the inner pipe and having an interior shoulder to form one end of the valve-chamber, an open cap on said sleeve forming the other end of said valve-chamber, a valve in said chamber, an annular flange on said sleeve against which the lower end of said inner pipe and the upper end of said cap abut, and a hollow, valved plunger within said inner pipe, substantially as set forth.

In testimony whereof I have signed this specification in the presence of two subscribing witnesses.

A. W. MAULDIN.

Witnesses:
FRANK OLNEY,
W. A. GRAY.